(12) United States Patent
Al-Alusi et al.

(10) Patent No.: US 9,011,216 B1
(45) Date of Patent: Apr. 21, 2015

(54) DIVERSION DIRECTIONAL NOZZLE

(75) Inventors: Thamir R. Al-Alusi, Mukilteo, WA (US); Julia W. Miller, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 1533 days.

(21) Appl. No.: 12/477,100

(22) Filed: Jun. 2, 2009

(51) Int. Cl.
*B64D 13/00* (2006.01)

(52) U.S. Cl.
CPC ....................... *B64D 13/00* (2013.01)

(58) Field of Classification Search
USPC ........... 454/76, 152, 153, 154, 155, 309, 292, 454/322, 284, 297, 299, 305; 239/590.5, 239/590.32
See application file for complete search history.

(56) References Cited

U.S. PATENT DOCUMENTS

| | | | | |
|---|---|---|---|---|
| 2,182,690 | A * | 12/1939 | Cole | 454/309 |
| 2,310,414 | A * | 2/1943 | Fritzam et al. | 454/68 |
| 2,568,044 | A * | 9/1951 | Wallen | 454/299 |
| 2,658,440 | A * | 11/1953 | Lange | 454/313 |
| 3,103,155 | A * | 9/1963 | Boylan et al. | 454/154 |
| 3,122,087 | A * | 2/1964 | Demuth et al. | 454/299 |
| 3,736,858 | A * | 6/1973 | Mercier | 454/286 |
| 4,616,558 | A * | 10/1986 | Ball et al. | 454/297 |
| 4,819,548 | A | 4/1989 | Horstman | |
| 6,413,159 | B1 | 7/2002 | Bates, III et al. | |
| 6,752,712 | B1 | 6/2004 | Short et al. | |
| 6,941,967 | B2 * | 9/2005 | Butera et al. | 137/351 |

* cited by examiner

*Primary Examiner* — Steven B McAllister
*Assistant Examiner* — Brittany Towns
(74) *Attorney, Agent, or Firm* — Klintworth & Rozenblat IP LLC

(57) ABSTRACT

An elongated nozzle for distributing airflow in varying directions may include at least one set of channels. Each set may include a plurality of groups of channels. Each set may further include spaced-apart opposed dividers extending lengthwise along an elongated length of the nozzle, and spaced-apart channel side-walls extending between the spaced-apart opposed dividers. The opposed dividers and the spaced-apart channel side-walls may form the channels of each set. At least one of the spaced-apart opposed dividers of each set may be oriented at a first angle which is non-parallel to an imaginary vertical plane extending along the elongated length of the nozzle. Within each set, the spaced-apart channel side-walls of each group of channels may be oriented at different second angles, relative to an imaginary vertical plane extending along a width of the nozzle, than the spaced-apart channel side-walls of other groups of channels.

33 Claims, 10 Drawing Sheets

DIVERSION DIRECTIONAL NOZZLE

FIELD OF THE INVENTION

The disclosure relates to an elongated nozzle for distributing airflow in varying directions.

BACKGROUND OF THE DISCLOSURE

Nozzles are often required to provide airflow. Nozzles may be especially useful to ventilate larger passenger vehicles including, but not limited to, aircraft, buses, and passenger trains. One application for a nozzle is to provide airflow within a cabin of an aircraft. Aircraft typically use nozzles in the cabin having two-dimensional airflow at the outlet of the nozzle. A two-dimensional airflow nozzle may have the same airflow distribution pattern at any section along the cabin. However, nozzles with two-dimensional airflow may have outlet airflow which cannot be diffused rapidly before reaching the passengers. This may result in one or more of the following issues: high airflow draft with low air temperature at the center seats of the cabin leading to reduced passenger thermal comfort; high temperature stratification across the cabin leading to reduced passenger thermal comfort; and low airflow velocity in the aisles leading to reduced flight-attendant comfort.

A nozzle and a method of distributing airflow in varying directions is needed which may solve one or more problems of one or more of the conventional nozzles and/or methods.

SUMMARY OF THE DISCLOSURE

In one embodiment, an elongated nozzle is disclosed for distributing airflow in varying directions. The elongated nozzle may comprise at least one set of channels. Each set may comprise a plurality of groups of channels. Each set may further comprise spaced-apart opposed dividers extending lengthwise along an elongated length of the nozzle, and spaced-apart channel side-walls extending between the spaced-apart opposed dividers. The opposed dividers and the spaced-apart channel side-walls may form the channels of each set. At least one of the spaced-apart opposed dividers of each set may be oriented at a first angle which is non-parallel to an imaginary vertical plane extending along the elongated length of the nozzle. Within each set, the spaced-apart channel side-walls of each group of channels may be oriented at different second angles, relative to an imaginary vertical plane extending along a width of the nozzle, than the spaced-apart channel side-walls of other groups of channels.

In another embodiment, an elongated nozzle is disclosed for providing three-dimensional, diffused, distributed airflow. The elongated nozzle may comprise a plurality of sets of channels. Each set may comprise a plurality of groups of channels. Each set may further comprise spaced-apart opposed dividers extending lengthwise along an elongated length of the nozzle, and spaced-apart channel side-walls extending between the spaced-apart opposed dividers. The opposed dividers and the spaced-apart channel side-walls may form the channels of each set. At least one of the spaced-apart opposed dividers of each set may be oriented at a first angle which is non-parallel to an imaginary vertical plane extending along the elongated length of the nozzle. Each set may comprise a different first angle than another set of channels. Within each set, the spaced-apart channel side-walls of each group of channels may be oriented at different second angles, relative to an imaginary vertical plane extending along a width of the nozzle, than the spaced-apart channel side-walls of other groups of channels. Further, within each set, the groups of channels may be oriented symmetrically around a center of the set to create diverging airflow on opposite sides of the center of the set.

In still another embodiment, a method of distributing airflow in varying directions is disclosed. In one step, at least one elongated nozzle may be provided. The provided elongated nozzle may comprise at least one set of channels. Each set may comprise a plurality of groups of channels. Each set may further comprise spaced-apart opposed dividers extending lengthwise along an elongated length of the at least one elongated nozzle, and spaced-apart channel side-walls extending between the spaced-apart opposed dividers. The opposed dividers and the spaced-apart channel side-walls may form the channels of each set. At least one of the spaced-apart opposed dividers of each set may be oriented at a first angle which is non-parallel to an imaginary vertical plane extending along the elongated length of the at least one elongated nozzle. Within each set, the spaced-apart channel side-walls of each group of channels may be oriented at different second angles, relative to an imaginary vertical plane extending along a width of the at least one elongated nozzle, than the spaced-apart channel side-walls of other groups of channels. In another step, airflow may be flowed through the at least one set of channels in order to provide three-dimensional, diffused, distributed airflow.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
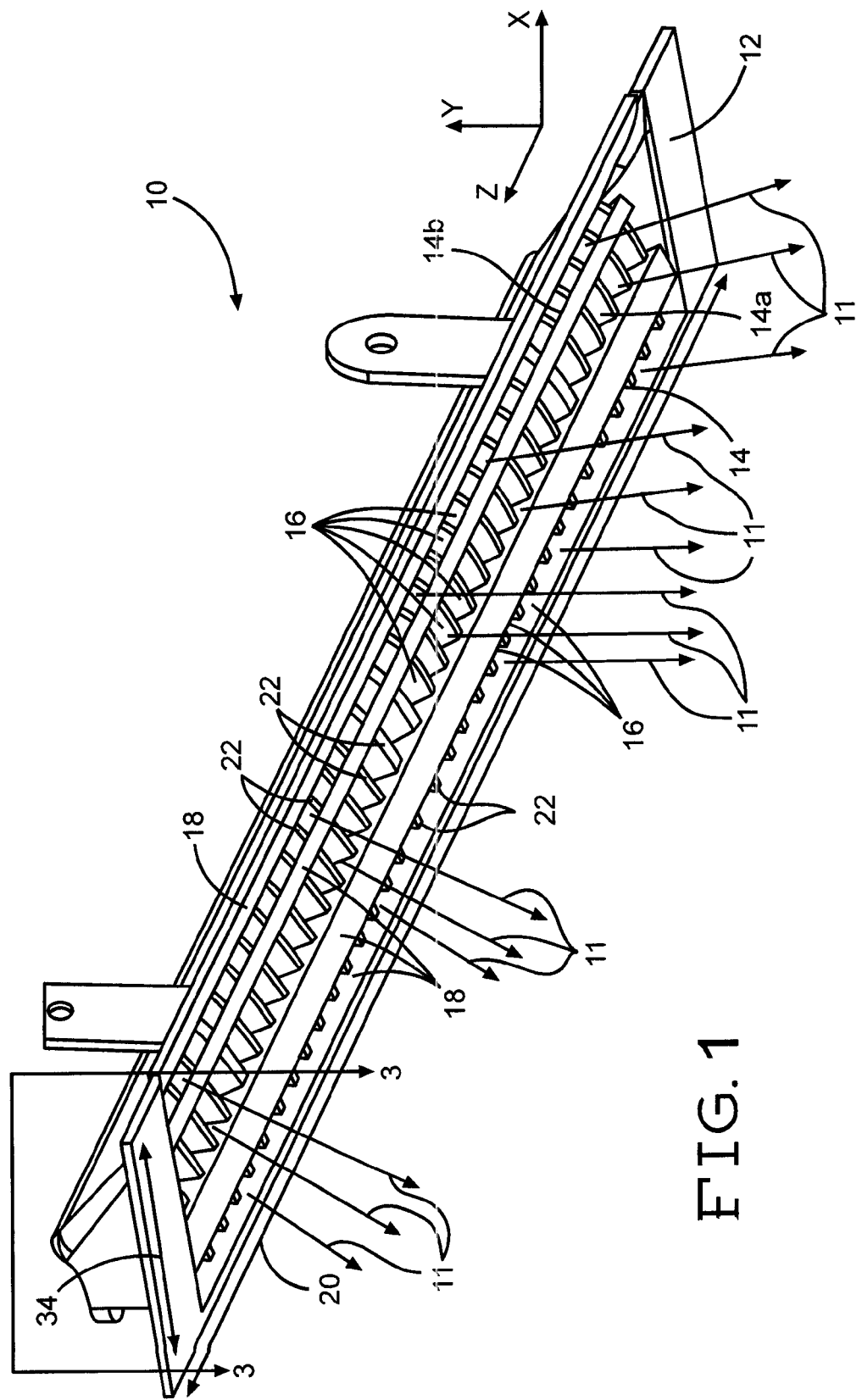
FIG. 1 illustrates a perspective view of one embodiment of an elongated nozzle for three-dimensional, diffused, distributed airflow.

FIG. 1 illustrates a perspective view of one embodiment of an elongated nozzle 10 for providing three-dimensional, diffused, distributed airflow 11 in the X, Y, and Z directions. FIG.

Figure 2:
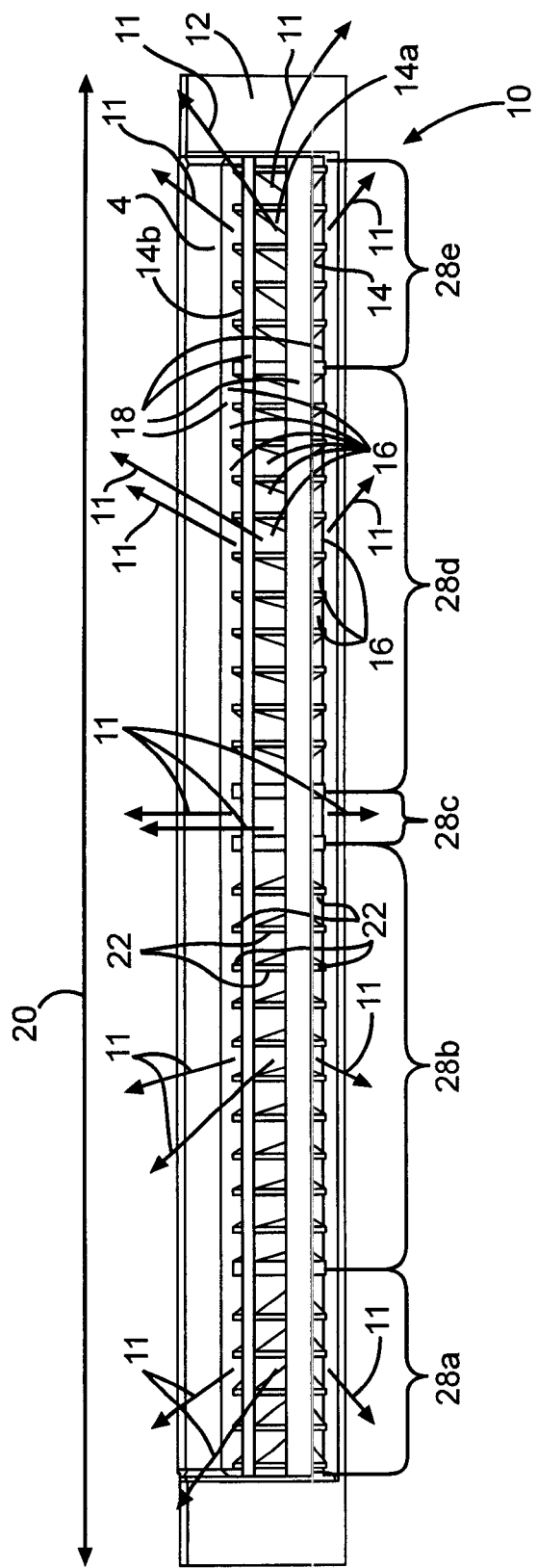
FIG. 2 illustrates a bottom view of the elongated nozzle of FIG. 1.
Figure 3:
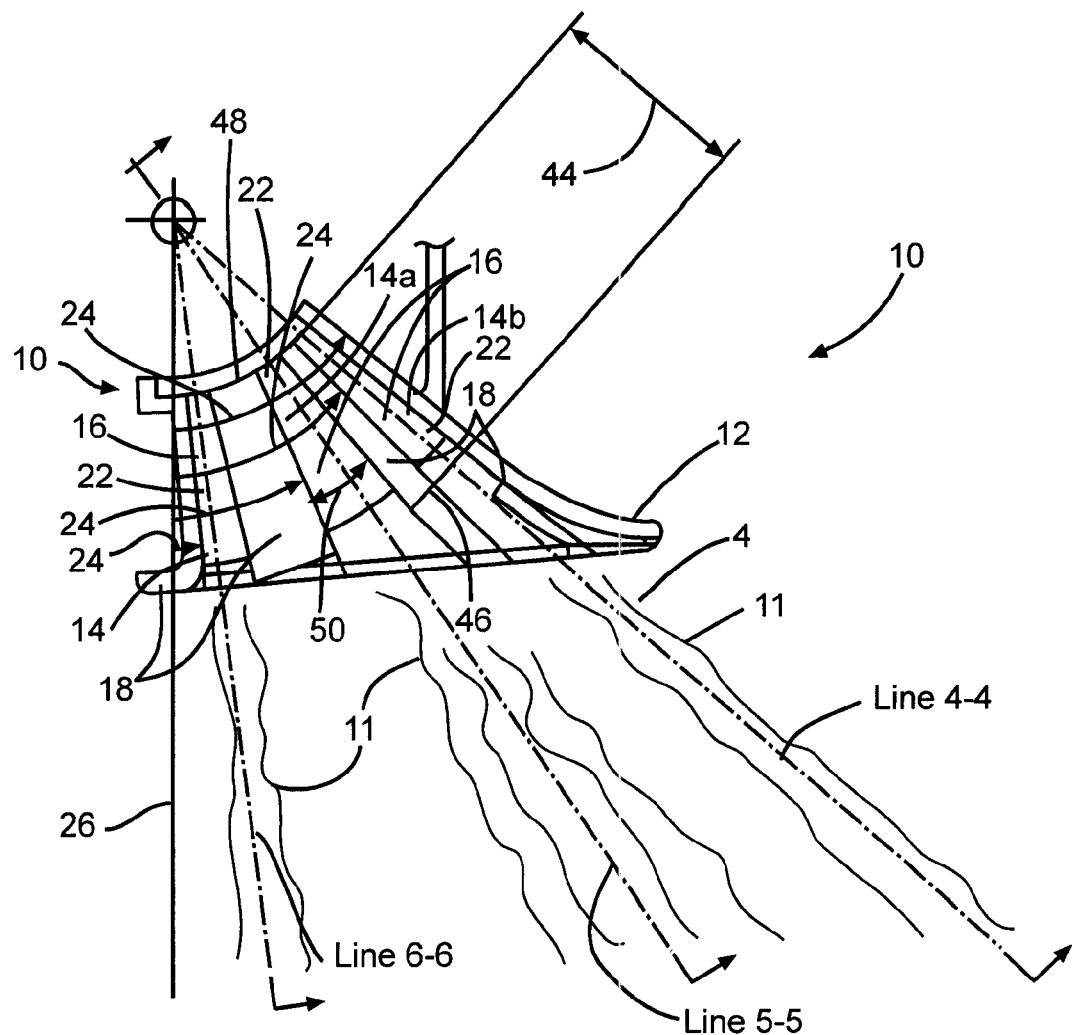
FIG. 3 illustrates a cross-section view along line 3-3 of the elongated nozzle of FIG. 1.

2 illustrates a bottom view of the elongated nozzle 10 of FIG. 1. FIG. 3 illustrates a cross-section view along line 3-3 of the elongated nozzle 10 of FIG. 1. As shown in FIGS. 1-3, the elongated nozzle 10 may comprise nozzle housing 12. Disposed within the nozzle housing 12 may be a plurality of sets 14, 14a, and 14b of channels 16. Although three sets 14, 14a, and 14b of channels 16 are shown, in other embodiments, the elongated nozzle 10 may comprise one or more sets 14 of channels 16.

Each set 14, 14a, 14b of channels 16 may comprise two spaced-apart opposed dividers 18 extending lengthwise along an elongated length 20 of the elongated nozzle 10, and spaced-apart channel side-walls 22 extending between the spaced-apart opposed dividers 13. The opposed dividers 18 and the spaced-apart channel side-walls 22 may form the channels 16 of each set 14, 14a, and 14b through which the airflow 11 may flow. As shown in FIG. 3, one or more of the opposed dividers 18 of each set 14, 14a, and 14b may be oriented at a first angle 24 which is non-parallel to an imaginary vertical plane 26 extending along the elongated length 20 (as shown in FIGS. 1 and 2) of the elongated nozzle 10. Each set 14-14b of channels 16 may have a different first angle 24 than another set 14-14b of channels 16. Set 14 may have a first angle 24 of substantially 2 degrees. Set 14a may have a first angle 24 of substantially 10 degrees. Set 14b may have a first angle 24 of substantially 40 degrees. The first angle 24 of each set 14-14b of channels 16 may be substantially in a range of 0 degrees to 40 degrees. In other embodiments, the first angle 24 of each set 14-14b of channels 16 may vary.

Figure 4:
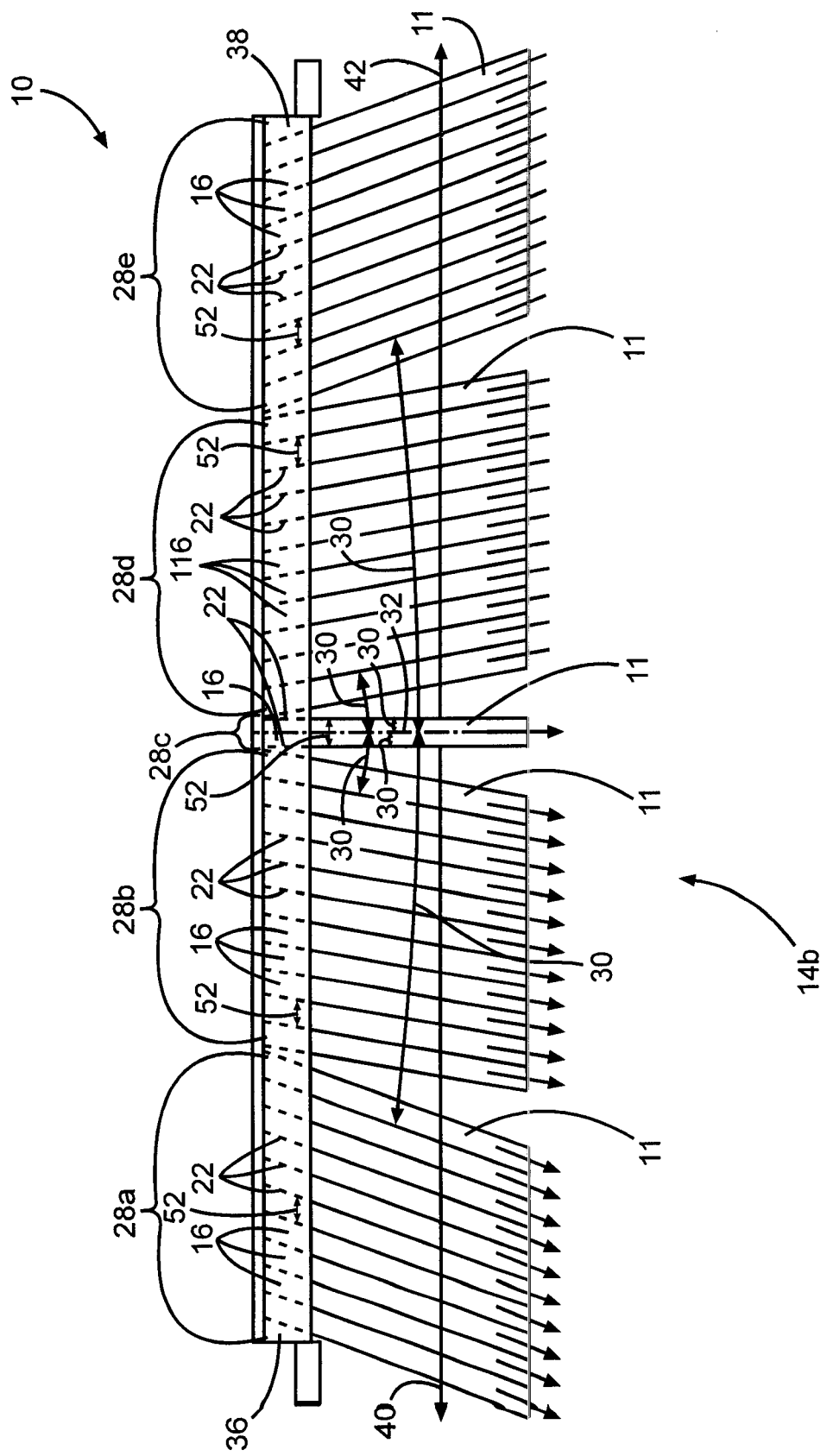
FIG. 4 illustrates a cross-section view along line 4-4 of the elongated nozzle of FIG. 3.
Figure 5:
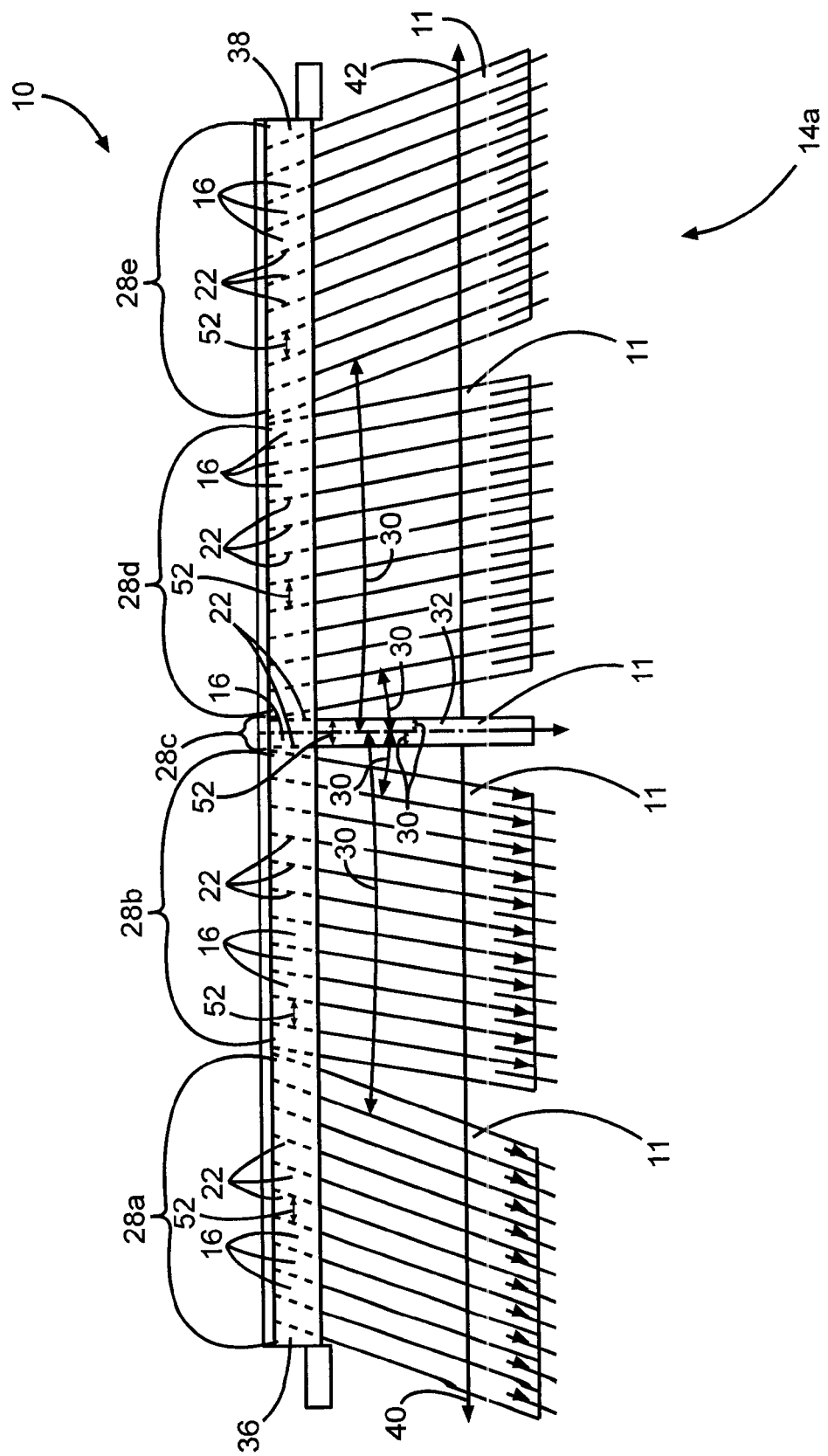
FIG. 5 illustrates a cross-section view along line 5-5 of the elongated nozzle of FIG. 3.
Figure 6:
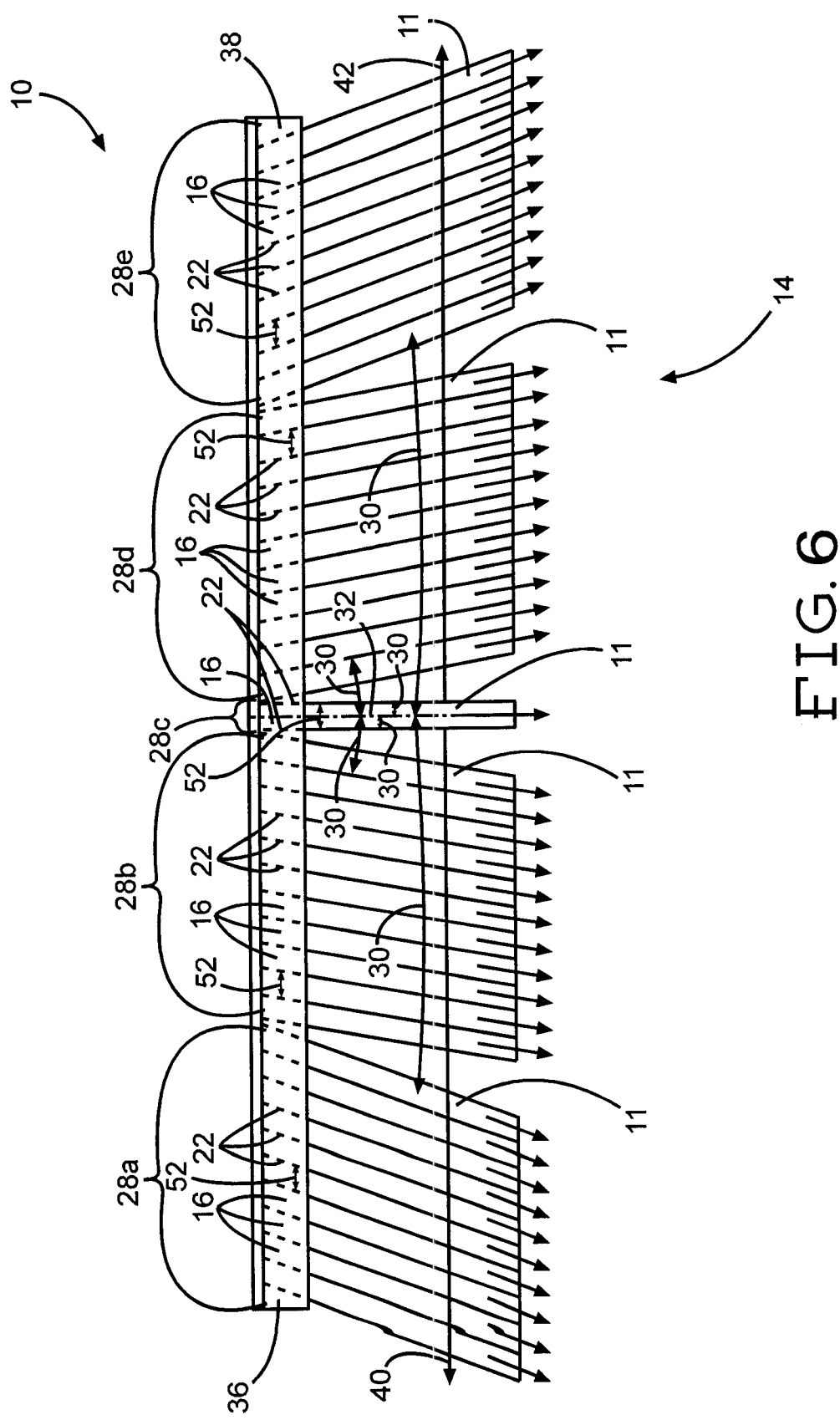
FIG. 6 illustrates a cross-section view along line 6-6 of the elongated nozzle of FIG. 3.

As shown in FIG. 2, each set 14, 14a, and 14b of channels 16 may comprise a plurality of groups 28a, 28b, 28c, 28d, and 28e of the channels 16. Although five groups 28a-28e of channels 16 are shown for each set 14-14b, in other embodiments, the sets 14-14b may have two or more groups 28a-28b of channels 16. FIGS. 4, 5, and 6 respectively illustrate cross-section views along lines 4-4, 5-5, and 6-6 of FIG. 3 showing the airflow 11 through each set 14b, 14a, and 14 of channels 16. As shown in FIGS. 4-6, within each set 14b, 14a, and 14 of channels 16, the spaced-apart channel side-walls 22 of each group 28a-28e of channels 16 may be oriented at different second angles 30, relative to an imaginary vertical plane 32 extending along a width 34 (shown in FIG. 1) of the elongated nozzle 10, than the spaced-apart channel side-walls 22 of other groups 28a-28e of channels 16. This may provide three-dimensional, diffused, distributed airflow 11 within each set 14, 14a, and 14b of channels 16.

As shown in FIGS. 4-6, within each set 14, 14a, and 14b of channels 16, groups 28a and 28b of channels 16 may be oriented to distribute airflow 11 towards one lengthwise end 36 of the elongated nozzle 10, while groups 28d and 28e of channels 16 may be oriented to distribute airflow 11 towards an opposed lengthwise end 38 of the elongated nozzle 10. Within each set 14, 14a, and 14b of channels 16, groups 28a, 28b, 28d, and 28e of channels 16 may be oriented symmetrically around a center group 28c of channels 16 to create diverging, symmetric airflow 11 on opposite sides 40 and 42 of the center group 28c of channels 16. In some embodiments, not all of the channels 16 of the sets 14-14b may have airflow 11 through them. The orientation of the groups 28a-28e of channels 16 within each set 14-14b of channels 16, in addition to the pattern of the open channels 16, may create three-dimensional, symmetric, rapidly-diffused, distributed airflow 11 of the elongated nozzle 10. Moreover, the orientation of the sets 14-14b of channels 16 may further assist in creating three-dimensional, rapidly-diffused, distributed airflow 11 using the elongated nozzle 10.

Within each set 14, 14a, and 14b of channels 16, the second angle 30 of groups 28a and 28e of channels 16 may be respectively substantially 20 and −20 degrees. Within each set 14, 14a, and 14b of channels 16, the second angle 30 of groups 28b and 28d of channels 16 may be respectively substantially 10 and −10 degrees. Within each set 14, 14a, and 14b of channels 16, the second angle 30 of the center group 28c of channels 16 may be substantially 0 degrees. All of the groups 28a-28e of channels 16 within each set 14-14b of channels 16 may have a second angle 30 substantially in a range of −20 degrees to 20 degrees. In other embodiments, the second angle 30 of the groups 28a-28e of channels 16 within each set 14-14b may vary.

As shown in FIG. 3, the channels 16 may have a height 44 from a bottom end 46 of each channel 16 to a top end 48 of each channel 16. The height 44 may be substantially in a range of 0.75 inches to 1.5 inches. The channels 16 may have a distance 50 between the spaced-apart dividers 18. The distance 50 may be substantially in a range of 0.1 inches to 0.5 inches. As shown in FIGS. 4-6, the channels 16 may have a distance 52 between the spaced-apart channel side-walls 22. The distance 52 may be substantially in a range of 0.5 inches to 1 inch.

Figure 7:
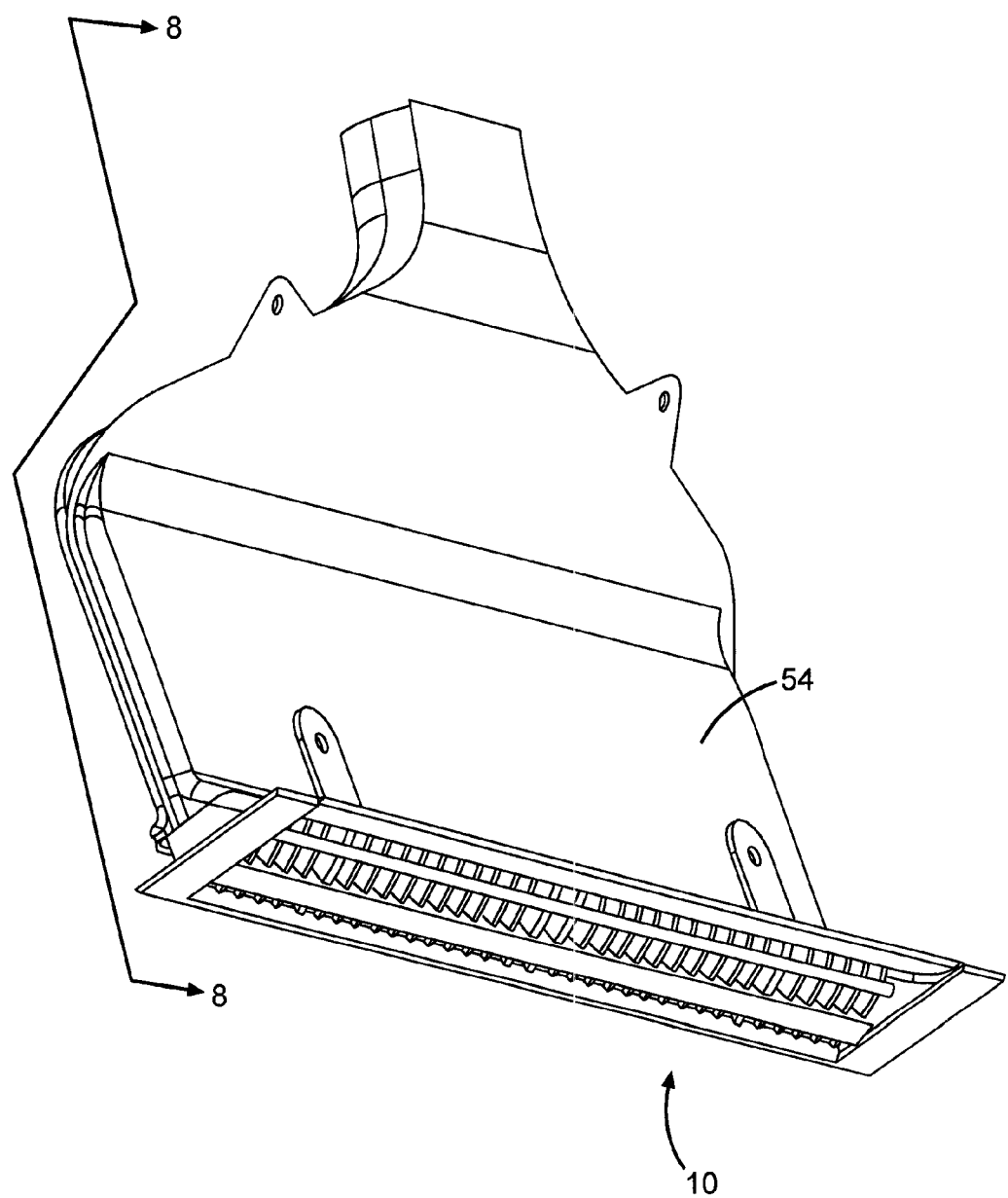
FIG. 7 illustrates a perspective view of the elongated nozzle of FIG. 1 connected to a plenum.
Figure 8:
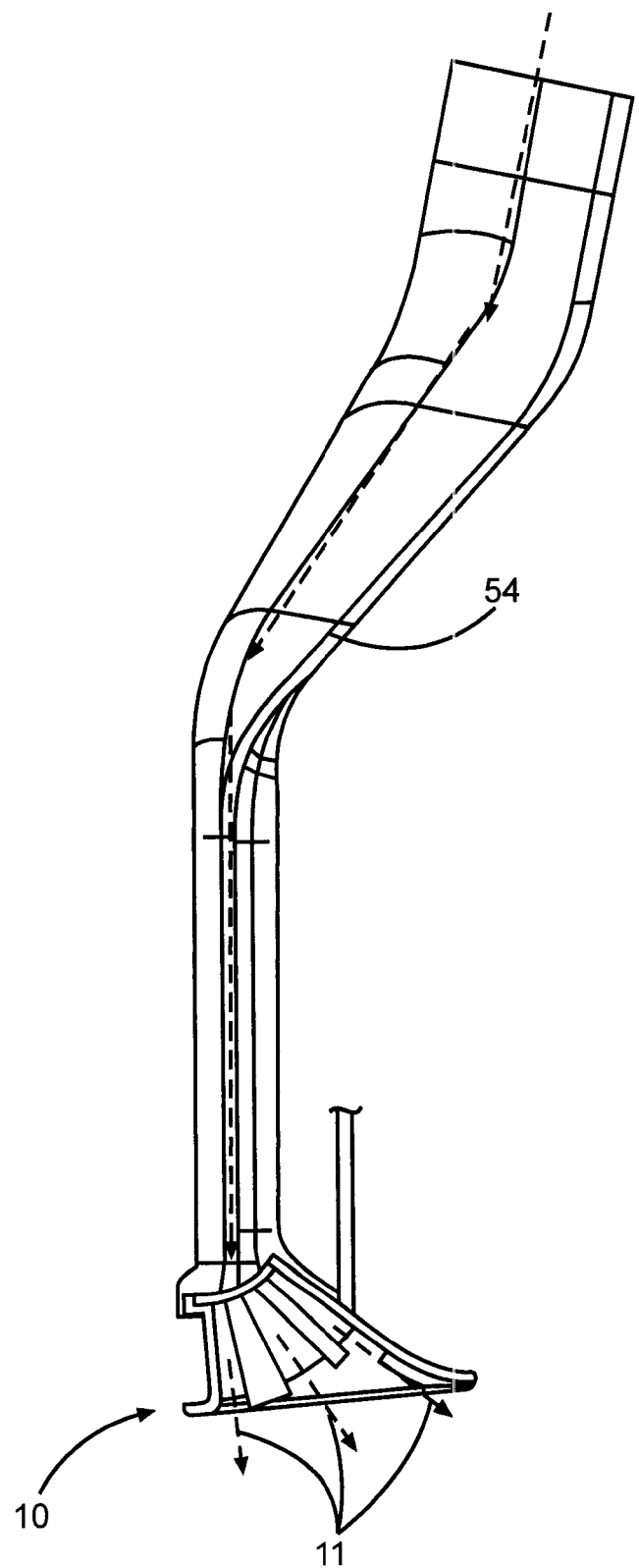
FIG. 8 illustrates a cross-section view along line 8-8 of the elongated nozzle of FIG. 7.

FIG. 7 illustrates a perspective view of the elongated nozzle 10 of FIG. 1 connected to a plenum 54, which has a flow restrictor to provide a uniform airflow 11 across the plenum 54. FIG. 8 illustrates a cross-section view along line 8-8 of FIG. 7. As shown in FIG. 8, the plenum 54 may be contoured to deliver the desired amount of airflow 11 to the elongated nozzle 10.

Figure 9:
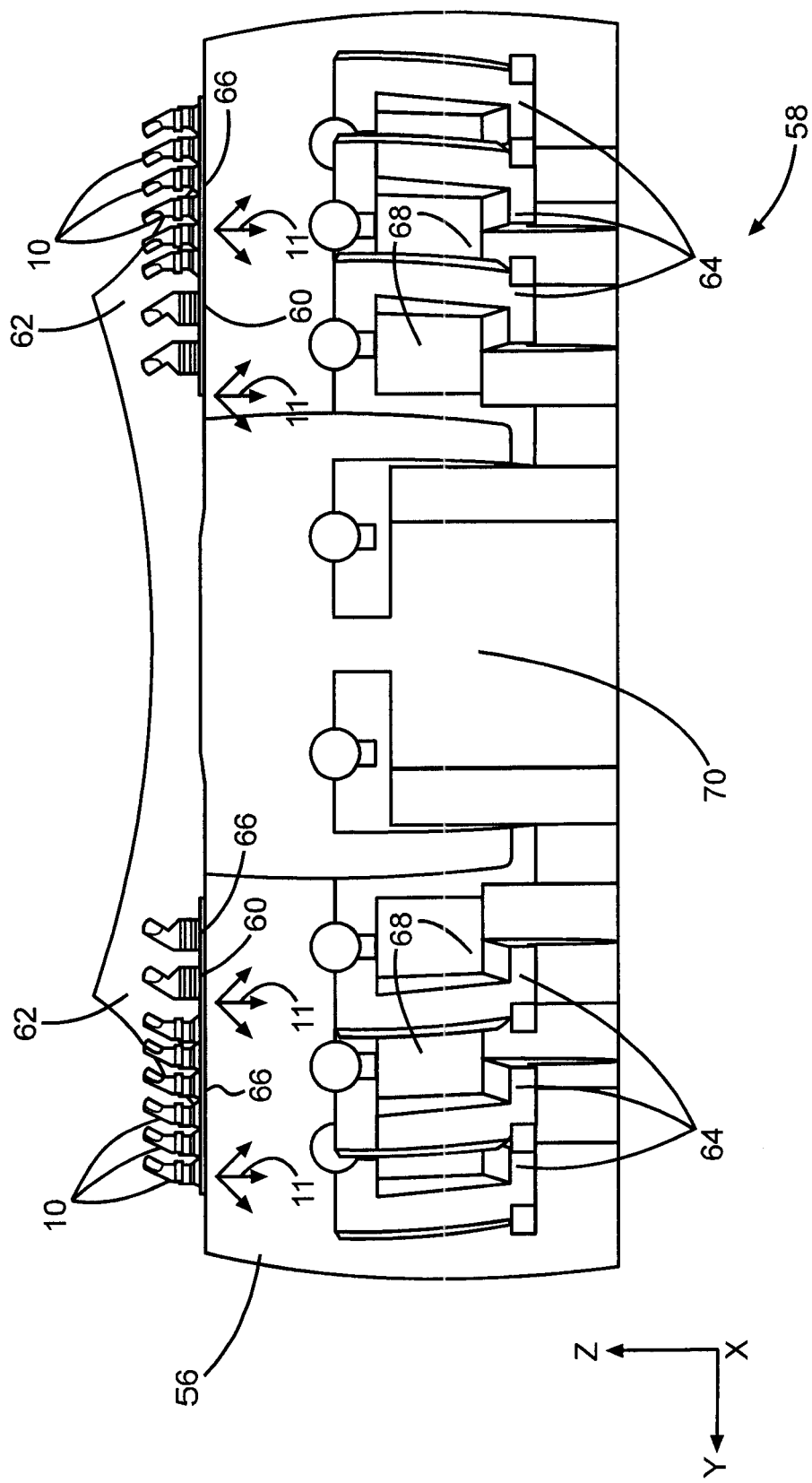
FIG. 9 illustrates a front view of a passenger cabin of an aircraft to show a plurality of the elongated nozzle of FIG. 1 distributed within the aircraft.

FIG. 9 illustrates a front view of a passenger cabin of a fuselage 56 of an aircraft 58 to show a plurality of the elongated nozzle 10 of FIG. 1 distributed within the aircraft 58. The elongated nozzles 10 may be disposed within a ceiling 60 of the aircraft 58, within a stowage bin 62 of the aircraft 58, and/or over passenger seats 64 of the aircraft 58. The design of the elongated nozzles 10 may provide for the following: diverging, symmetric airflow 11 which may fan out in vertical and axial directions in order to diffuse high velocity airflow 11 rapidly over a short distance; small nozzle outlets 66 to meet aircraft design constraints; short nozzle outlets 66 which may provide a high enough velocity airflow 11 to deliver the required volumetric airflow 11, while providing a large enough distance between the outlets 66 and the passengers 68 to diffuse the airflow 11 before reaching the passengers 68; early detach from the stowage bins 62 which may result in widely diffused airflow 11 in the aisles 70 of the aircraft 58; and/or multiple outlet jets of airflow 11 which may be tuned for a wide range of interior design to satisfy passenger 68 comfort.

The elongated nozzles 10 may provide thermal comfort to passengers 68 by providing airflow 11 which has the following qualities: low air velocity at passenger 68 head level to avoid air drafts; high air velocity at the aisle 70 standing head level to improve conditions for flight-attendants; reduced temperature stratification within the aircraft 58; improved air turbulence within the aircraft 58 resulting in improved air mixing and more uniform aircraft cabin temperature; and improved ventilation effectiveness.

Figure 10:
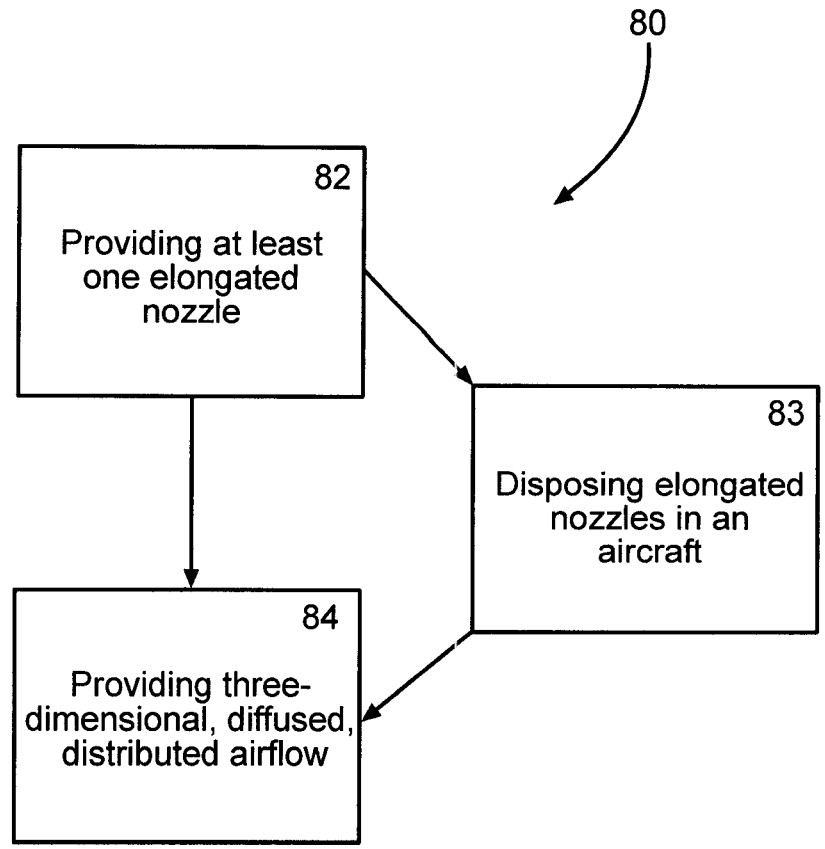
FIG. 10 illustrates a flowchart of one embodiment of a method of distributing airflow in varying directions.

FIG. 10 illustrates a flowchart of one embodiment of a method 80 of distributing airflow 11 in varying directions. In step 82, at least one elongated nozzle 10 may be provided. The at least one provided elongated nozzle 10 may comprise any of the embodiments disclosed herein. The at least one provided elongated nozzle 10 may comprise at least one set 14-14b of channels 16. The at least one provided elongated nozzle 10 may comprise a plurality of sets 14-14b of channels

16. Each set 14-14b may comprise a plurality of groups 28a-28e of channels 16. Each set 14-14b may comprise spaced-apart opposed dividers 18 extending lengthwise along an elongated length 20 of the at least one elongated nozzle 10, and spaced-apart channel side-walls 22 extending between the spaced-apart opposed dividers 18. The opposed dividers 18 and the spaced-apart channel side-walls 22 may form the channels 16 of each set 14-14b.

At least one of the spaced-apart opposed dividers 18 of each set 14-14b may be oriented at a first angle 24 which is non-parallel to an imaginary vertical plane 26 extending along the elongated length 20 of the at least one elongated nozzle 10. Each set 14-14b of channels 16, of the at least one provided elongated nozzle 10, may comprise a different first angle 24 than another set 14-14b of channels 16. Within each set 14-14b, the spaced-apart channel side-walls 22 of each group 28a-28e of channels 16 may be oriented at different second angles 30, relative to an imaginary vertical plane 32 extending along a width 34 of the at least one elongated nozzle 10, than the spaced-apart channel side-walls 22 of other groups 28a-28e of channels 16.

Within each set 14-14b of the at least one provided elongated nozzle 10, at least one of the groups 28a and 28b of channels 16 may be oriented to distribute airflow 11 towards one lengthwise end 36 of the at least one provided elongated nozzle 10, and at least another of the groups 28d and 28e of channels 16 may be oriented to distribute airflow 11 towards an opposed lengthwise end 38 of the at least one provided elongated nozzle 10. Within each set 14-14b of the at least one provided elongated nozzle 10, the groups 28a, 28b, 28d, and 28e of channels 16 may be oriented symmetrically around a center group 28c of channels 16 to create diverging airflow 11 on opposite sides 40 and 42 of the center group 28c of channels 16.

In step 84, airflow 11 may be flowed through the at least one set 14-14b of channels 16 in order to provide three-dimensional, diffused, distributed airflow 11. Optional step 83 may comprise disposing a plurality of the at least one provided elongated nozzle 10 in an aircraft 58. If optional step 83 is implemented, step 84 may comprise flowing the airflow 11 through the at least one set 14-14b of channels 16 in order to provide three-dimensional, diffused, distributed airflow 11 within the aircraft 58 to substantially eliminate air drafts, to substantially eliminate air temperature stratification, and to substantially mix the airflow 11 with existing air within the aircraft 58.

One or more embodiments of the disclosure may provide a nozzle 10 which has channels 16 having varying orientations, both vertically and axially, in order to provide three-dimensional, diffused, distributed airflow 11 in the X, Y, and Z directions. This may result in improved thermal conditions and/or airflow distribution within an aircraft 58, within another type of vehicle, and/or within another type of structure.

It should be understood, of course, that the foregoing relates to exemplary embodiments of the disclosure and that modifications may be made without departing from the spirit and scope of the disclosure as set forth in the following claims.

We claim:

1. An elongated nozzle for distributing diffused, three-dimensional airflow comprising:
    a substantially planar exit through which substantially all air exiting the nozzle flows;
    a plurality of sets of channels, each set comprising a plurality of groups of channels;
    wherein each set of channels is defined by spaced-apart opposed surfaces extending lengthwise along an elongated length of the nozzle and spaced-apart channel side-walls extending between and arranged substantially orthogonal to the spaced-apart opposed surfaces, the opposed surfaces and the spaced-apart channel side-walls forming the channels of each set, at least one of the spaced-apart opposed surfaces of each set is oriented at a first angle which is non-parallel to an imaginary plane which is substantially orthogonal to the plane of the exit of the nozzle, and extending along the elongated length of the nozzle;
    wherein, within each set, the spaced-apart channel side-walls of each group of channels are oriented at different second angles, relative to an imaginary plane which is substantially orthogonal to the plane of the exit of the nozzle, and extending along a width of the nozzle, than the spaced-apart channel side-walls of other groups of channels;
    wherein each channel has its own respective inlet area where airflow enters the channel and its own respective outlet area where the airflow exits the channel, the outlet area being larger than the inlet area to diffuse the airflow as it travels through and out of the channel to provide three-dimensional, diffused, distributed airflow.

2. The elongated nozzle of claim 1 wherein, within each set, at least one of the groups of channels is oriented to distribute airflow towards one lengthwise end of the elongated nozzle, and at least another of the groups of channels is oriented to distribute airflow towards an opposed lengthwise end of the elongated nozzle.

3. The elongated nozzle of claim 2 wherein, within each set, the groups of channels are oriented symmetrically around a center group of channels to create diverging airflow on opposite sides of the center group of channels.

4. The elongated nozzle of claim 3 wherein the second angle of the center group of channels is substantially 0 degrees.

5. The elongated nozzle of claim 1 wherein each set of channels comprises five groups of channels.

6. The elongated nozzle of claim 5 wherein each set of channels comprises a first group of channels having a second angle of substantially 0 degrees, a second group of channels having a second angle of substantially 10 degrees, a third group of channels having a second angle of substantially −10 degrees, a fourth group of channels having a second angle of substantially 20 degrees, and a fifth group of channels having a second angle of substantially −20 degrees.

7. The elongated nozzle of claim 1 wherein the groups of channels within each set of channels each have a second angle substantially in a range of −20 degrees to 20 degrees.

8. The elongated nozzle of claim 1 wherein a height of the channels from a bottom end of each channel to a top end of each channel is substantially in a range of 0.75 inches to 1.5 inches.

9. The elongated nozzle of claim 1 wherein a distance of the channels between the spaced-apart channel side-walls is substantially in a range of 0.5 inches to 1 inch, and a distance of the channels between the spaced-apart opposed surfaces is substantially in a range of 0.1 inches to 0.5 inches.

10. The elongated nozzle of claim 1 comprising a plurality of sets of channels.

11. The elongated nozzle of claim 10 wherein each set of channels comprises a different first angle than another set of channels.

12. The elongated nozzle of claim 11 wherein the first angle of each set of channels is substantially in a range of 0 degrees to 40 degrees.

13. The elongated nozzle of claim 11 comprising three sets of channels.

14. The elongated nozzle of claim 13 wherein a first set of channels has a first angle of substantially 2 degrees, a second set of channels has a first angle of substantially 10 degrees, and a third set of channels has a first angle of substantially 40 degrees.

15. The elongated nozzle of claim 1 wherein the elongated nozzle is disposed in at least one of an aircraft, a ceiling of the aircraft, a stowage bin of the aircraft, or over passenger seats of the aircraft.

16. The elongated nozzle of claim 14 wherein a plurality of the elongated nozzle are distributed within the aircraft.

17. An elongated nozzle for providing three-dimensional, diffused, distributed airflow comprising:
a substantially planar exit through which substantially all air exiting the nozzle flows;
a plurality of sets of channels, each set comprising a plurality of groups of channels;
wherein each set of channels is defined by spaced-apart opposed surfaces extending lengthwise along an elongated length of the nozzle and spaced-apart channel side-walls extending between and arranged substantially orthogonal to the spaced-apart opposed surfaces, the opposed surfaces and the spaced-apart channel side-walls forming the channels of each set, at least one of the spaced-apart opposed surfaces of each set is oriented at a first angle which is non-parallel to an imaginary plane which is substantially orthogonal to the plane of the exit of the nozzle, and extending along the elongated length of the nozzle;
wherein each set comprises a different first angle than another set of channels;
wherein, within each set, the spaced-apart channel side-walls of each group of channels are oriented at different second angles, relative to an imaginary plane which is substantially orthogonal to the plane of the exit of the nozzle, and extending along a width of the nozzle, than the spaced-apart channel side-walls of other groups of channels;
wherein, within each set, the groups of channels are oriented symmetrically around a center of the set to create diverging airflow on opposite sides of the center of the set;
wherein each channel has its own respective inlet area where airflow enters the channel and its own respective outlet area where the airflow exits the channel, the outlet area being larger than the inlet area to diffuse the airflow as it travels through and out of the channel to provide three-dimensional, diffused, distributed airflow.

18. The elongated nozzle of claim 17 wherein, within each set, the groups of channels are oriented symmetrically around a center group of channels to create diverging airflow on opposite sides of the center group of channels, the second angle of the center group of channels being substantially 0 degrees.

19. A method of diffusing and distributing airflow in three-dimensions comprising:
providing at least one elongated nozzle comprising: a substantially planar exit through which substantially all air exiting the nozzle flows; a plurality of sets of channels, each set comprising a plurality of groups of channels; wherein each set of channels is defined by spaced-apart opposed surfaces extending lengthwise along an elongated length of the at least one elongated nozzle and spaced-apart channel side-walls extending between and arranged substantially orthogonal to the spaced-apart opposed surfaces, the opposed surfaces and the spaced-apart channel side-walls forming the channels of each set, at least one of the spaced-apart opposed surfaces of each set being oriented at a first angle which is non-parallel to an imaginary plane which is substantially orthogonal to the plane of the exit of the nozzle, and extending along the elongated length of the at least one elongated nozzle; wherein, within each set, the spaced-apart channel side-walls of each group of channels are oriented at different second angles, relative to an imaginary plane which is substantially orthogonal to the plane of the exit of the nozzle, and extending along a width of the at least one elongated nozzle, than the spaced-apart channel side-walls of other groups of channels; wherein each channel has its own respective inlet area where airflow enters the channel and its own respective outlet area where the airflow exits the channel, the outlet area being larger than the inlet area; and
flowing the airflow through the plurality of sets of channels in order to provide three-dimensional, diffused, distributed airflow.

20. The method of claim 19 wherein, within each set of the at least one provided elongated nozzle, at least one of the groups of channels is oriented to distribute airflow towards one lengthwise end of the at least one provided elongated nozzle, and at least another of the groups of channels is oriented to distribute airflow towards an opposed lengthwise end of the at least one provided elongated nozzle.

21. The method of claim 19 wherein, within each set of the at least one provided elongated nozzle, the groups of channels are oriented symmetrically around a center group of channels to create diverging airflow on opposite sides of the center group of channels.

22. The method of claim 19 wherein the at least one provided elongated nozzle comprises a plurality of sets of channels.

23. The method of claim 22 wherein each set of channels, of the at least one provided elongated nozzle, comprises a different first angle than another set of channels.

24. The method of claim 19 further comprising the step of disposing a plurality of the at least one provided elongated nozzle in an aircraft, and the flowing step comprises flowing the airflow through the plurality of sets of channels in order to provide the three-dimensional, diffused, distributed airflow within the aircraft to substantially eliminate air drafts, to substantially eliminate air temperature stratification, and to substantially mix the airflow with existing air within the aircraft.

25. The elongated nozzle of claim 1 wherein a height of each channel from a bottom end of each channel to a top end of each channel is greater than a distance between the opposed surfaces of each channel, and is also greater than the distance between the channel side-walls of each channel.

26. The elongated nozzle of claim 17 wherein a height of each channel from a bottom end of each channel to a top end of each channel is greater than a distance between the opposed surfaces of each channel, and is also greater than the distance between the channel side-walls of each channel.

27. The method of claim 19 wherein a height of each channel from a bottom end of each channel to a top end of each channel is greater than a distance between the opposed surfaces of each channel, and is also greater than the distance between the channel side-walls of each channel.

28. The elongated nozzle of claim 1 wherein the inlet area of each channel extends, at a first location where airflow first enters the channel, between the spaced-apart opposed surfaces of each channel and the spaced-apart channel side-walls of each channel, and the outlet area of each channel extends, at a second location where airflow exits the channel, between the spaced-apart opposed surfaces of each channel and the spaced-apart channel side-walls of each channel.

29. The elongated nozzle of claim 17 wherein the respective inlet area of each channel extends, at a first location where airflow first enters the channel, between the spaced-apart opposed surfaces of each channel and the spaced-apart channel side-walls of each channel, and the respective outlet area of each channel extends, at a second location where airflow exits the channel, between the spaced-apart opposed surfaces of each channel and the spaced-apart channel side-walls of each channel.

30. The method of claim 19 wherein the respective inlet area of each channel extends, at a first location where airflow first enters the channel, between the spaced-apart opposed surfaces of each channel and the spaced-apart channel side-walls of each channel, and the respective outlet area of each channel extends, at a second location where airflow exits the channel, between the spaced-apart opposed surfaces of each channel and the spaced-apart channel side-walls of each channel.

31. The elongated nozzle of claim 1 wherein the elongated nozzle comprises an outlet nozzle for distributing the airflow in a vehicle.

32. The elongated nozzle of claim 17 wherein the elongated nozzle comprises an outlet nozzle for distributing the airflow in a vehicle.

33. The method of claim 19 wherein the elongated nozzle comprises an outlet nozzle which flows the airflow through the plurality of sets of channels in order to provide the three-dimensional, diffused, distributed airflow in a vehicle.

\* \* \* \* \*